US010831277B2

(12) United States Patent
Araújo et al.

(10) Patent No.: US 10,831,277 B2
(45) Date of Patent: Nov. 10, 2020

(54) REGION OF INTEREST CLASSIFICATION

(71) Applicant: Telefonaktiebolaget LM Ericsson (publ), Stockholm (SE)

(72) Inventors: José Araújo, Stockholm (SE); Lars Andersson, Solna (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/470,337

(22) PCT Filed: Dec. 21, 2016

(86) PCT No.: PCT/EP2016/082185
§ 371 (c)(1),
(2) Date: Jun. 17, 2019

(87) PCT Pub. No.: WO2018/113953
PCT Pub. Date: Jun. 28, 2018

(65) Prior Publication Data
US 2019/0332177 A1 Oct. 31, 2019

(51) Int. Cl.
*G09G 5/00* (2006.01)
*G06F 3/01* (2006.01)
(52) U.S. Cl.
CPC .................... *G06F 3/016* (2013.01)
(58) Field of Classification Search
CPC .......... G06F 3/01; G06F 3/016; G06F 3/0416; G09B 21/003; G06K 9/3233
See application file for complete search history.

(56) References Cited

U.S. PATENT DOCUMENTS

| 2009/0128306 A1* | 5/2009 | Luden ..................... G06F 3/016 340/407.1 |
| 2010/0251305 A1* | 9/2010 | Kimble ............... H04N 21/4668 725/46 |
| 2011/0191684 A1* | 8/2011 | Greenberg ................ G06F 3/01 715/719 |
| 2012/0128224 A1 | 5/2012 | Yu et al. |
| 2014/0049491 A1 | 2/2014 | Nagar et al. |

(Continued)

OTHER PUBLICATIONS

International Search Report and Written Opinion of the International Searching Authority for International Application No. PCT/EP2016/082185 dated Mar. 2, 2017.

(Continued)

*Primary Examiner* — Joe H Cheng
(74) *Attorney, Agent, or Firm* — Sage Patent Group

(57) ABSTRACT

There is provided mechanisms for region of interest classifying a region. The region is represented by haptic data and visual data. The method is performed by a controller. The method comprises obtaining the haptic data and the visual data of the region. The method comprises quality rating the haptic data in at least part of the region based on at least one property of the haptic data and with respect to the visual data in the at least part of the region. The method comprises defining at least one region of interest in the region by modifying at least one of the haptic data and the visual data of the at least part of the region according to the quality rating of the haptic data, thereby region of interest classifying the region.

20 Claims, 5 Drawing Sheets

(56) References Cited

U.S. PATENT DOCUMENTS

| | | |
|---|---|---|
| 2014/0072221 A1 | 3/2014 | Sakai et al. |
| 2014/0132547 A1* | 5/2014 | Adachi .................. G06F 3/041 |
| | | 345/173 |
| 2015/0067819 A1* | 3/2015 | Shribman ............... H04L 67/02 |
| | | 726/12 |
| 2015/0255076 A1* | 9/2015 | Fejzo ...................... G10L 19/24 |
| | | 704/500 |
| 2016/0217293 A1 | 7/2016 | Farkash et al. |
| 2017/0032630 A1* | 2/2017 | Gervais ................... G08B 6/00 |
| 2018/0168781 A1* | 6/2018 | Kopelman ............. G16H 50/50 |

OTHER PUBLICATIONS

Xu et al., "Point Cloud-Based Model-Mediated Teleoperation With Dynamic and Perception-Based Model Updating," IEEE Transactions on Instrumentation and Measurement, vol. 63, No. 11, Nov. 2014, pp. 2558-2569.

* cited by examiner

US 10,831,277 B2

REGION OF INTEREST CLASSIFICATION

CROSS REFERENCE TO RELATED APPLICATION

This application is a 35 U.S.C. § 371 national stage application of PCT International Application No. PCT/EP2016/082185, filed on Dec. 21, 2016, the disclosure of which is hereby incorporated herein by reference in its entirety.

TECHNICAL FIELD

Embodiments presented herein relate to a method, a controller, a computer program, and a computer program product for classifying a region represented by haptic data and visual data.

BACKGROUND

In general terms, haptic communication aims at recreating the sense of touch by applying forces, vibrations, or motions to the user. Such stimulation can be used to assist in the creation of virtual objects in a computer simulation, to control such virtual objects, to create more intuitive user interfaces, to improve media consumption experience, and to enhance the remote control of machines and devices.

Haptic perception consists of kinaesthetic and tactile sense and relates to the sensation of the size, shape, mass, texture and stiffness of physical objects, surfaces, etc. Kinaesthetic information refers to the information perceived when moving joints, muscles and tendons, while tactile information refers to information retrieved via the skin. By utilizing devices with kinaesthetic and tactile actuators, a remote operator is able to perceive all the above properties of objects.

Systems that combine haptic and visual feedback using haptic user interface devices (such as joysticks held by the user, haptic touchscreens, or gloves worn by the user) and visual user interface devices (such as screens viewed by the user or head mounted displays worn by the user) have been proposed. But in haptic explorations, users have to physically explore regions to "feel" them and cannot quickly "see" or "hear" these regions, as in video and audio applications.

At the same time, the quality of the haptic data representing objects and/or surfaces in the regions to be explored may vary with respect to time and space, due to sensor limitations, memory, processing and acquisition limitations as well as modelling complexity.

Hence, there is a need to ensure that the regions to be explored meet user expectation.

SUMMARY

An object of embodiments herein is to provide mechanisms for ensuring that the regions to be explored meet user expectation According to a first aspect there is presented a method for region of interest classifying a region. The region is represented by haptic data and visual data. The method is performed by a controller. The method comprises obtaining the haptic data and the visual data of the region. The method comprises quality rating the haptic data in at least part of the region based on at least one property of the haptic data and with respect to the visual data in said at least part of the region. The method comprises defining at least one region of interest in the region by modifying at least one of the haptic data and the visual data of said at least part of the region according to the quality rating of the haptic data, thereby region of interest classifying the region.

Advantageously, by region of interest classifying a region represented by haptic data and visual data it can be ensured that regions to be explored meet user expectation.

In turn, this advantageously provides a good user experience for a user exploring the region.

Advantageously this method is efficient for identifying, classifying and selecting regions of interest for haptic exploration of objects and/or surfaces in the regions of interest.

Advantageously this method could identify, select, and recommend, based on high haptic quality, which regions are the most relevant to be explored.

Advantageously this method thus enables users to be directed to regions having high haptic quality. This will improve the user experience of users using a haptic and visual system.

Advantageously, this method could identify, select, and recommend, based on low haptic quality, which regions should be avoided to be explored.

Advantageously this method thus enables users to be diverted away from regions having low haptic quality. This will increase the efficiency of using a haptic and visual system, and additionally reduce user frustration.

Advantageously, by increasing the haptic exploration efficiency, the time required for haptic exploration is reduced, which has a direct impact on the energy consumption of both the haptic user interface device and the visual user interface device.

According to a second aspect there is presented a controller for region of interest classifying a region. The region is represented by haptic data and visual data. The controller comprises processing circuitry. The processing circuitry is configured to cause the controller to obtain the haptic data and the visual data of the region. The processing circuitry is configured to cause the controller to quality rate the haptic data in at least part of the region based on at least one property of the haptic data and with respect to the visual data in said at least part of the region. The processing circuitry is configured to cause the controller to define at least one region of interest in the region by modifying at least one of the haptic data and the visual data of said at least part of the region according to the quality rating of the haptic data, thereby region of interest classifying the region.

According to a third aspect there is presented a controller for region of interest classifying a region. The region is represented by haptic data and visual data. The controller comprises processing circuitry and a storage medium. The storage medium stores instructions that, when executed by the processing circuitry, cause the controller to perform operations, or steps. The operations, or steps, cause the controller to obtain the haptic data and the visual data of the region. The operations, or steps, cause the controller to quality rate the haptic data in at least part of the region based on at least one property of the haptic data and with respect to the visual data in said at least part of the region. The operations, or steps, cause the controller to define at least one region of interest in the region by modifying at least one of the haptic data and the visual data of said at least part of the region according to the quality rating of the haptic data, thereby region of interest classifying the region.

According to a fourth aspect there is presented a controller for region of interest classifying a region. The region is represented by haptic data and visual data. The controller comprises an obtain module configured to obtain the haptic data and the visual data of the region. The controller comprises a rate module configured to quality rate the haptic data in at least part of the region based on at least one property of the haptic data and with respect to the visual data in said at least part of the region. The controller comprises a define module configured to define at least one region of interest in the region by modifying at least one of the haptic data and the visual data of said at least part of the region according to the quality rating of the haptic data, thereby region of interest classifying the region.

According to a fifth aspect there is presented a computer program for region of interest classifying a region. The region is represented by haptic data and visual data. The computer program comprises computer code which, when run on processing circuitry of a controller, causes the controller to perform operations, or steps. The operations, or steps, cause the controller to obtain the haptic data and the visual data of the region. The operations, or steps, cause the controller to quality rate the haptic data in at least part of the region based on at least one property of the haptic data and with respect to the visual data in said at least part of the region. The operations, or steps, cause the controller to define at least one region of interest in the region by modifying at least one of the haptic data and the visual data of said at least part of the region according to the quality rating of the haptic data, thereby region of interest classifying the region.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
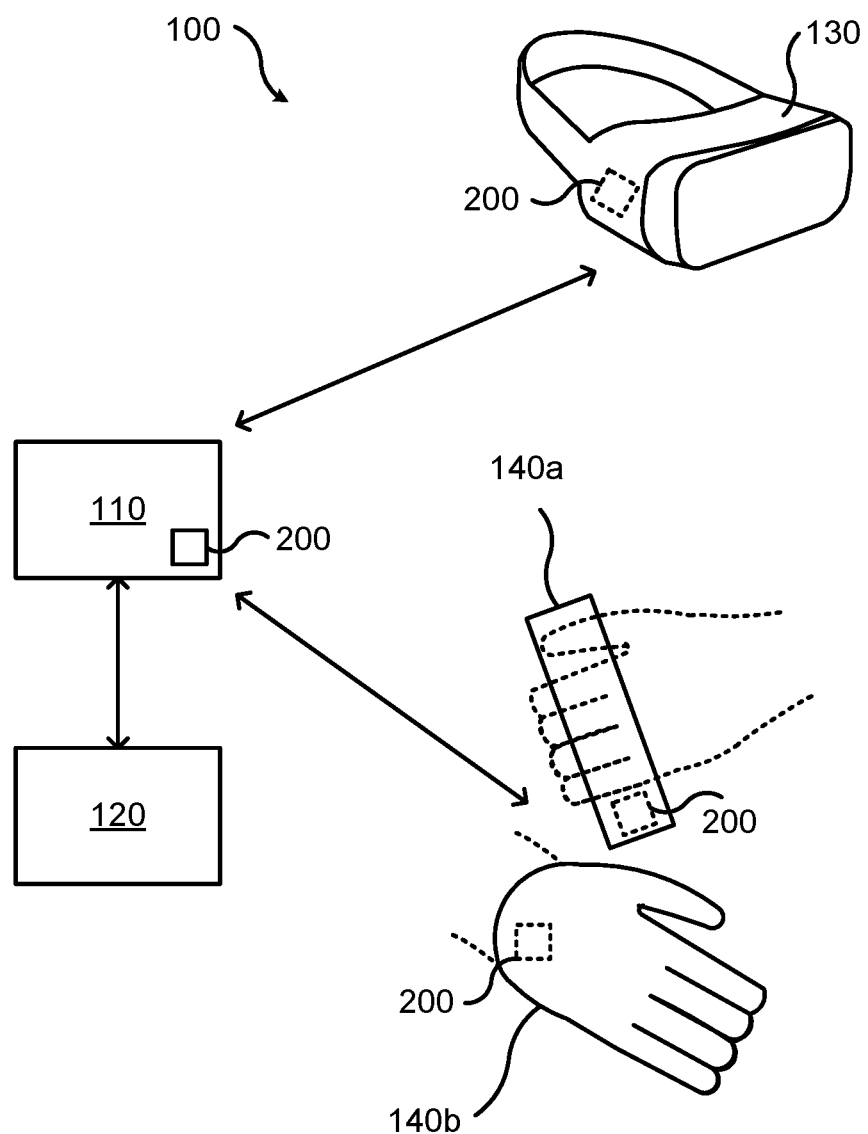
FIG. 1 is a schematic diagram illustrating a haptic and visual system according to embodiments.

FIG. 1 is a schematic diagram illustrating a haptic and visual system 100 where embodiments presented herein can be applied. The haptic and visual system 100 comprises a server no, a database 120 storing visual data and haptic data, a visual user interface device 130, and two examples of a haptic user interface device 140a (joystick to be held by the user), 140b (glove to be worn by the user).

In general terms, the server no is configured to receive real-time haptic and visual data from sensors, or at least to retrieve such information from the database 120. The server no is further configured to receive information from the user interface device 140a, 140b such as device position, velocity, and acceleration information of the user interface device 140a, 140b. Additional information such as the user eye gaze and user position may also be received by the server 110.

The visual user interface device 130 could comprise a touchscreen, a 2D display or a 3D display (such as a head-mountable display) and is configured to display visual data to the user. For a 3D display, a 3D visual model could be constructed from 2D image data and depth data as captured by 3D sensors. Objects represented by the 2D image data and depth data are stored and rendered as point clouds or as meshes on the 3D display. The 3D visual model may also be computed generated as point clouds or meshes. Point cloud models use vertices to describe all the points that compose the cloud, while a mesh is a collection of vertices, edges and faces that define the shape of a polyhedral object.

The haptic user interface device 140a, 140b is configured to provide haptic feedback to the user. Haptic feedback could be provided according to a haptic model. A haptic model is composed by geometric and physical properties of the scene rendered by the visual user interface device 130. The geometric component (shape, size, etc.) is typically encoded in the depth data captured by 3D sensors or the mesh or point cloud model, while physical properties (such as stiffness, friction, texture, temperature, vibration, force, and weight, etc.) are defined for each point/surface of the geometric model. The physical properties typically acquired by accelerometers, position sensors, force sensors, cameras and/or spectrometers.

At least one of the server no, the visual user interface device 130, and the haptic user interface device 140a, 140b comprises a controller 200. Alternatively, the functionality of the controller 200 is distributed between at least two of the server no, the visual user interface device 130, and the haptic user interface device 140a, 140b. Functionality as well as other aspects of the controller 200 will be disclosed below.

All units (server no, database 120, visual user interface device 130, and haptic user interface device 140a, 140b) are assumed to have communication capabilities, as schematically indicated by arrows in FIG. 1, such that data and information as disclosed above can be communicated between the units.

Figure 2:
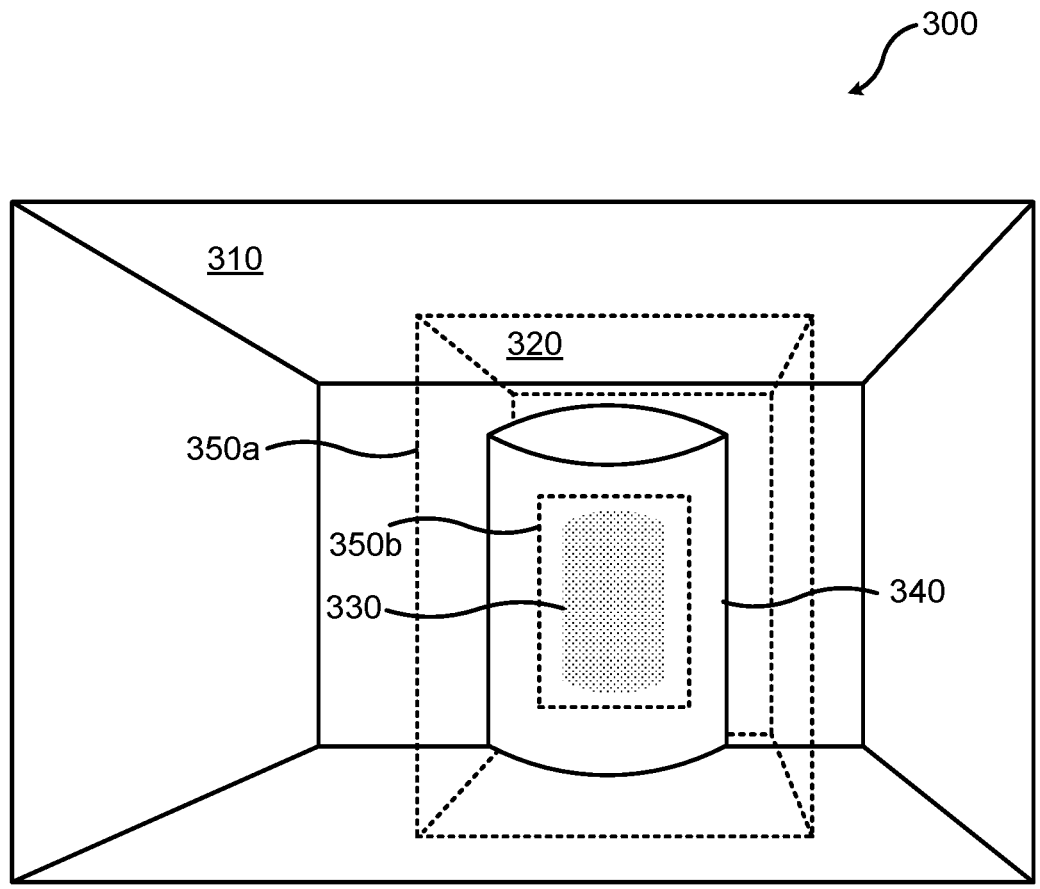
FIG. 2 is a schematic illustration of a view as presented by a visual user interface device.

FIG. 2 is a schematic illustration of a view 300 as presented by the visual user interface device 130. The view 300 displays a region 310. A part of the region 310 is illustrated at reference numeral 320. At reference numeral 330 is illustrated a region of interest. In this respect, a region of interest could be defined as a part of the region 310 where the haptic quality is comparatively high (or even comparatively low) with respect to the haptic quality of the rest of the region 310. The haptic quality may be regarded as comparatively high when haptic data points of the region of interest are densely placed, are representative of comparatively many physical properties (such as stiffness, friction, texture, temperature, vibration, force, and weight), are not constant over a visually heterogeneous area, and/or are labeled as representing a region of interest by a user. Further details of identifying regions of interest by rating haptic quality from haptic data and visual data will be disclosed below. The view 300 further displays an object 340. An outline 350a, 350b is shown around the at least part 320 of the region 310.

Optimally, for each 3D point/surface of the object 340, haptic data, provided in terms of haptic data points, should be available for rendering it to the user at the visual user interface device 130. However, this is typically not the case since the data capturing may not have covered the complete object 340, e.g., due to memory size, processing and acquisition time, modelling complexity, etc. Moreover, the object 340 may have a highly heterogeneous resolution in certain areas or in its whole, or it may be the case that the haptic model may have various degrees of quality due to poor modelling or sensing tools for certain parts of the object 340. Moreover, the quality and resolution of the object 340 may vary with time.

The embodiments disclosed herein therefore relate to mechanisms for classifying a region 310 represented by haptic data and visual data. It can be assumed that the haptic data is composed of, or comprises, haptic data points and that the visual data is composed of, or comprises, visual data points. In order to obtain such mechanisms there is provided a controller 200, a method performed by the controller 200, a computer program product comprising code, for example in the form of a computer program, that when run on a controller 200, causes the controller 200 to perform the method.

Figure 3:
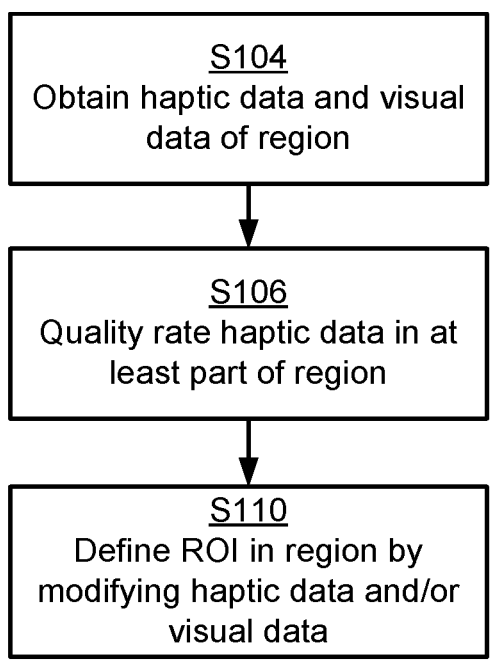
FIGS. 3, 4, and 5 are flowcharts of methods according to embodiments.
Figure 4:
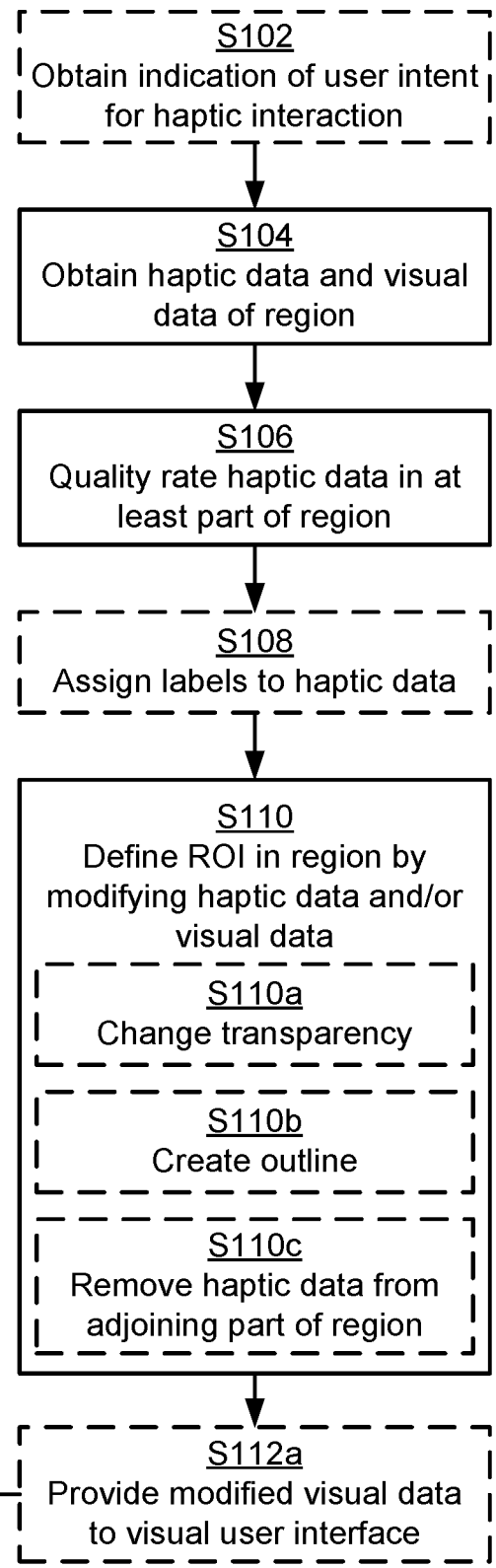

FIGS. 3 and 4 are flow charts illustrating embodiments of methods for classifying a region 310 represented by haptic data and visual data. The methods are performed by the controller 200. The methods are advantageously provided as computer programs 820.

Reference is now made to FIG. 3 illustrating a method for classifying a region 310 represented by haptic data and visual data as performed by the controller 200 according to an embodiment.

The classification is based on the haptic data and the visual data of the region 310 and the controller 200 is therefore configured to obtain this data by performing step S104:

S104: The controller 200 obtains the haptic data and the visual data of the region 310.

Once the haptic data and the visual data have been obtained the haptic data is quality rated. However, not all the haptic quality data need to be quality rated at once. Rather the haptic data in at least part 320 of the region 310 is quality rated. Hence, the controller 200 is configured to perform step S106:

S106: The controller 200 quality rates the haptic data in at least part 320 of the region 310 based on at least one property of the haptic data and with respect to the visual data in this at least part 320 of the region 310. Aspects of how to select which part 320 of the region 310 that is to be quality rated as well as aspects of the quality rating itself will be provided below.

Depending on the outcome of the quality rating of the part 320 of the region 310 the controller 200 modifies the haptic data and/or the visual data. This modification implies that a region of interest 330 has been defined in the region 310. Hence, the controller 200 is configured to perform step S110:

S110: The controller 200 defines at least one region of interest 330 in the region 310 by modifying at least one of the haptic data and the visual data of the at least part 320 of the region 310 according to the quality rating of the haptic data, thereby region of interest classifying the region 310.

That is, once at least one region of interest 330 has been defined in the region 310, the region 310 is considered to have been region of interest classified.

Embodiments relating to further details of classifying a region 310 represented by haptic data and visual data as performed by the controller 200 will now be disclosed.

Reference is now made to FIG. 4 illustrating methods for classifying a region 310 represented by haptic data and visual data as performed by the controller 200 according to further embodiments. It is assumed that steps S104, S106, S110 are performed as described above with reference to FIG. 3 and a thus repeated description thereof is therefore omitted.

Detection of User Intent for Haptic Interaction

Detection of user intent may be achieved by analyzing the position, velocity and acceleration of the haptic user interface device 140a, 140b which the user is manipulating. Hence, according to an embodiment the controller 200 is configured to perform step S102:

S102: The controller 200 obtains, from the haptic user interface device 140a, mob, an indication of user intent for haptic interaction with an object 340 in the part 320 of the region 310.

The user eye gaze and user position may be used to understand which region, or regions, the user is intending to interact with. Hence, the at least part 320 of the region 310 to be quality rated could be based on input from the visual user interface device 130 and/or the haptic user interface device 140a, 140b identifying the at least part 320 of the region 310.

The haptic data and the visual data could be retrieved or received upon the detection of user intent for haptic interaction with a given object (as given by the indication obtained in step S102). Hence, according to an embodiment the haptic data and the visual data of the object 340 are obtained in response to step S102 being performed. That is, step S102 may be performed before step S104.

Generally, according to an embodiment at least part 320 of the region 310 comprises an object 340. The object 340 may have an interior and a surface enclosing the interior. The haptic data and the visual data of the at least part 320 of the region 310 may then relate to the surface of the object 340 or the interior of the object 340. In this respect the interior may either be solid or be layered, possibly comprising more than one solid component.

Rating Haptic Quality from Haptic Data and Visual Data

In general terms, for any region of the visual model, there may be no haptic model available, while in certain cases the haptic model is available but is of varying quality.

Aspects of identifying regions of low quality in the haptic data will now be disclosed. As the skilled person understands, parts of the regions not fulfilling at least some of the below criteria may be candidates for being regarded as regions of interest.

Regions of low quality in the haptic data may, for example, be identified from the fact that the haptic data points representing physical properties (such as stiffness, friction, texture, temperature, vibration, force, and weight, etc.) fulfill any of the below criteria.

According to a first criterion, the haptic data points are sparsely missing within a certain part of the region since, e.g. the sensor capturing of the haptic data did not scan the complete region. Hence, according to an embodiment the at least one property of the haptic data relates to amount of details in the haptic data. For example, the amount of details could relate to the sparsity of the haptic data points, or in other words the density of the haptic data points. The amount of details could be either relative or absolute.

According to a second criterion, the haptic data acquisition has low quality, based on stiffness being acquired based solely on position sensors that measure the surface displacement, and not on a combination of output from a position sensors output from a force sensor, and/or based on that information of friction and texture only is acquired visually and not with an accelerometer.

According to a third criterion, the values of the haptic data points are constant over a visually heterogeneous area. This could for example be due to an average being obtained for a certain part of the region for reducing the haptic model complexity. That is, the quality rating could be based on properties of the visual data. Hence, according to an embodiment the quality rating the haptic data is based on amount of details in the visual data. The amount of details could be either relative or absolute.

According to a fourth criterion, the haptic data points are labeled as such by the user exploring the haptic data points or by the data acquisition operator/robot. In this respect, a user/robot may be able to perceive that the haptic feedback that user/robot is receiving is not representative of the part of the region that is being scanned.

According to a fifth criterion, certain physical properties (such as, but not limited to, stiffness, friction, texture, temperature, vibration, force, and weight, etc.) are missing for certain haptic data points for the part of the region. That is, only a subset of the complete haptic properties for the region is available.

Each of these criteria may be given an index, or coefficient, which then directly translates into a quality factor within a certain part of the region of the visual model.

Further, common to all these criteria is that the quality rating could comprise correlating the haptic data in at least part 320 of the region 310 with the visual data in this part 320 of the region 310. Correlating the haptic data in at least part 320 of the region 310 with the visual data in this part 320 of the region 310 could create haptic quality indexes for given visual regions.

In some aspects, each quality index is associated with a certain degree of importance. Thus, the determination of the quality for a given part of the region could take such importance into account. Hence, according to an embodiment each labels is associated with a respective level importance indication, and wherein the quality rating of the haptic data depends on the level of importance indication. As an example, indication of absence of haptic data may be regarded more import than indication of a specific quality of the haptic information. In another example, parts of the region with high geometric heterogeneity may have higher importance than homogeneous areas.

The low quality of the haptic model may further depend on the visual data quality. According to an aspect the visual data acquisition has low quality due to, for example, that vision sensors are not able to capture the part of the region in a suitable manner (due to low luminosity, camera vibrations, etc.) while the haptic data of the same part of the region is of good quality. Hence, according to an embodiment the quality rating of the haptic data is based on visual information of the at least part 320 of the region 310. The visual information is received from the visual user interface device 130. In this case, the user may feel the region well using the haptic user interface 140a, 140b, but the visual information is of low quality, reducing the user experience. In this case, the rating of the haptic quality of the part of the region could be set to low.

The low quality of the haptic model may further depend on characteristics of the haptic user interface device 140a, 140b itself. Hence, according to an embodiment the quality rating of the haptic data is based on at least one property of the haptic user interface device 140a, 140b. For example the part of the region could be set to have a low quality rating if the haptic user interface device 140a, 140b cannot cover the complete haptic output range required by the part of the region.

As an example, the required acceleration to be given by the haptic user interface device 140a, 140b with respect to the texture in a specific part of the region could be above the maximum acceleration capability of the haptic user interface device 140a, 140b.

The haptic quality may differ not only with respect to space but also time. For example, according to some aspects any of the above criteria may be varying in case of real-time visual and haptic data acquisition. Hence, according to an embodiment the quality rating of the haptic data is time dependent.

Any of the above disclosed criteria could be used to eliminate parts of the region from being candidates for regions of interest. Conversely, as noted above, parts of the regions not fulfilling at least some of the above criteria may be candidates for being regarded as regions of interest.

For ease of notation, a parameter Q may be defined as the quality parameter of the haptic data. This parameter Q may be space dependent and hence be referred to as Q(p), where p is the 2D or 3D spatial coordinates of a specific part of the region. In other examples, p is the coordinates of a 3D mesh surface, or the coordinates of a defined 3D model surface. As disclosed above, the quality parameter may be time dependent, and hence be written Q(p, t) where t is a time stamp.

The quality parameter Q may take real or discrete values. For example, a four-level scale could range from no haptic data (Q(p)=1), low quality (Q(p)=2), medium quality (Q(p)=3), to high quality (Q(p)=4)).

As detailed above, the criterions for identifying regions of low quality in the haptic data could be based on the haptic data and/or the visual data. According to some aspects the contributions from both types of data is combined. Hence, the quality parameter Q could be written as Q(p)=h(p)+v(p), where h and v are functions which capture the quality for each of the haptic data (by the function h) and visual data (by the function v).

Further, the quality of the haptic data could represent contributions for, for example, at least one haptic property in a group of stiffness, friction, texture, temperature, vibration, force, and weight, and be written as $h(p)=a1 \cdot s(p)+a2 \cdot f(p)+a3 \cdot t(p)+a4 \cdot c(p)+a\ 5 \cdot v(p)+a6 \cdot n(p)+a\ 7 \cdot w(p)$, where s is a function that represents stiffness, f is a function that represents friction, t is a function that represents texture, c is a function that represents temperature, v is a function that represents vibration, n is a function that represents force, and w is a function that represents weight. The parameters a1, a2, a3, a4, a5, a6, a7 are scaling coefficients. The scaling coefficients could map the importance of each haptic property into the quality parameter Q.

Additionally or alternatively, the scaling coefficients could be based on the quality of the sensor scanning used to obtain the data points as described above.

Further, with reference to the above described first criterion, the scaling coefficients could be based on the sparsity of the data points, and hence the value for h(p) for a part of the region where data points are sparsely missing could be set to a low value.

Further, with reference to the above described fourth criterion, the scaling coefficients could be based on the label set to the data points, and hence the value for h(p) for a given part of the region may correspond to the label set to the data points for the given part of the region.

Further, with reference to the above described fifth criterion, if data is missing at a given part of the region, the scaling coefficients for the corresponding missing data (stiffness, friction, texture, temperature, vibration, force, and weight, etc.) may take a value of 0, hence yielding a low quality coefficient.

In terms of the function v for the quality of the visual data, v(p) could be written as $v(p)=b1 \cdot v(p)$, where the parameter b1 is a scaling factor which describes the amount of color and depth data or not in the data point p. Hence, according to an embodiment the quality rating of the haptic data depends on color and depth information in the visual data in the at least part 320 of the region 310. The scaling factor b1 may additionally or alternatively be determined based on the quality of the scanning as performed by the vision sensors as described above. The scaling factor b1 may additionally or alternatively be determined based on the importance of the visual data. In further aspects, the color data and the depth data are separated, each having different quality indices. This could, for example, be the case when the color data and the depth data are captured by different sensors.

As the skilled person understands, the above description of the functions Q(p), h(p), and v(p) are only examples. Other linear or nonlinear functions may be devised for Q(p), h(p) and v(p).

Labeling Parts of Region

According to some aspects a label is set within the part of the region, where the label has a value based on the quality index. The label could be set in a data field of the haptic data representing the part of the region or in a data field of the visual data representing the part of the region. The label could be represented by a flag. The label could be represented by a single binary digit, thus indicating whether the part of the region has high haptic quality or not. Alternatively, the label takes values as represented by the above disclosed quality parameter Q. Hence, according to an embodiment the controller 200 is configured to perform step S108:

S108: The controller 200 assigns labels to the haptic data with respect to the quality rating of the haptic data.

Modification of Haptic Data and/or Visual Data According Quality Rating

There could be different ways to modify the haptic data and/or the visual data.

According to some aspects the modification involves to change the transparency (haptic and/or visual) in a part of the region depending on the quality rating of the part of the region. Hence, according to an embodiment the controller 200 is configured to perform step S110*a* as part of step S110:

S110*a*: The controller 200 changes a transparency parameter of at least one of the visual data and the haptic data of the at least part 320 of the region 310.

For example, the transparency of a part of the region where the haptic quality is lower than a certain threshold value, or below a medium quality, could be increased, and vice versa.

According to some aspects the modification involves to create an outline around the part of the region that has been quality rated. Hence, according to an embodiment the controller 200 is configured to perform step S110*b* as part of step S110:

S110*b*: The controller 200 creates an outline 350*a*, 350*b* around the at least part 320 of the region 310 in at least one of the haptic data and the visual data.

For example, the outline could be provided in terms of a visual highlight box, contour, etc. around any part of the region that has a high haptic quality (or that comprise non-zero haptic data), and vice versa.

For example, the contour could have an edge which will be felt by the user when exploring the part of the region.

For example, the contour could cause the part of the region having low haptic quality to become "blocked" in a sense that if the user tries to feel the part of the region, it will be physically blocked by a virtual wall defined by the contour or that haptic feedback, for example a vibration, is provided by the haptic user interface device 140*a*, 140*b* when the user passes the contour.

According to some aspects the modification involves to remove at least part of the haptic data of the at least part 320 of the region 310 having low haptic quality such that comparatively low haptic feedback, or no haptic feedback at all, is provided in this at least part 320 of the region 310, or alternatively, if this at least part 320 of the region 310 is of high haptic quality then surrounding haptic data could be removed. Hence, according to an embodiment where the quality rating of the haptic data in the at least part 320 of the region 310 indicates that the at least part 320 of the region 310 has higher haptic quality than an adjoining part of the region 310, the controller 200 is configured to perform step S110*c* as part of step S110:

S110*c*: The controller 200 removes haptic data from the adjoining part (i.e. from a part of the region 310 that adjoins the at least part 320 of the region 310).

In some aspects at least one of steps S110*a*, S110*b*, S110*c* is performed as part of step S110. Hence, in some aspects the modifying in step s110 comprises modifying both visual data and haptic data.

According to some aspects the modification is performed according to the value of the label assigned in step S108. That is, in embodiments where labels have been assigned to the haptic data with respect to the quality rating of the haptic data (as in step S108), the haptic data and/or the visual data could be modified according to the labels.

According to some aspects the modification depends directly on the haptic data quality as given by Q(p). For example, denote by T(p) the transparency level at data point p. Then, according to an example, $T(p)=1-Q(p)$, where it is assumed that Q(p) takes a value in the range from 0 to 1, that is, Q(p)∈[0,1]. Further, the color, or thickness, of the outline may depend on the quality Q(p).

Transmission of Modified Haptic Data and/or Modified Visual Data

As disclosed above, the visual data and/or the haptic data is modified in step S110.

In some aspects, if the visual data is modified, then the controller 200 provides the thus modified visual data to the visual user interface device 130 for display to the user, i.e., so that the visual user interface device 130 could present the modified visual data to the user. Hence, according to an embodiment the controller 200 is configured to perform step S112a when the visual data is modified:

S112a: The controller provides the modified visual data to the visual user interface device 130.

In some aspects, if the haptic data is modified, then the controller 200 provides the thus modified haptic data to the haptic user interface device 140a, 140b for the user to feel it. Hence, according to an embodiment the controller 200 is configured to perform step S112b when the haptic data is modified:

S112b: The controller provides the modified haptic data to the haptic user interface device 140a, 140b.

If both the visual data and the haptic data are modified then at least one of steps S112a and step S112b could be performed.

Figure 5:
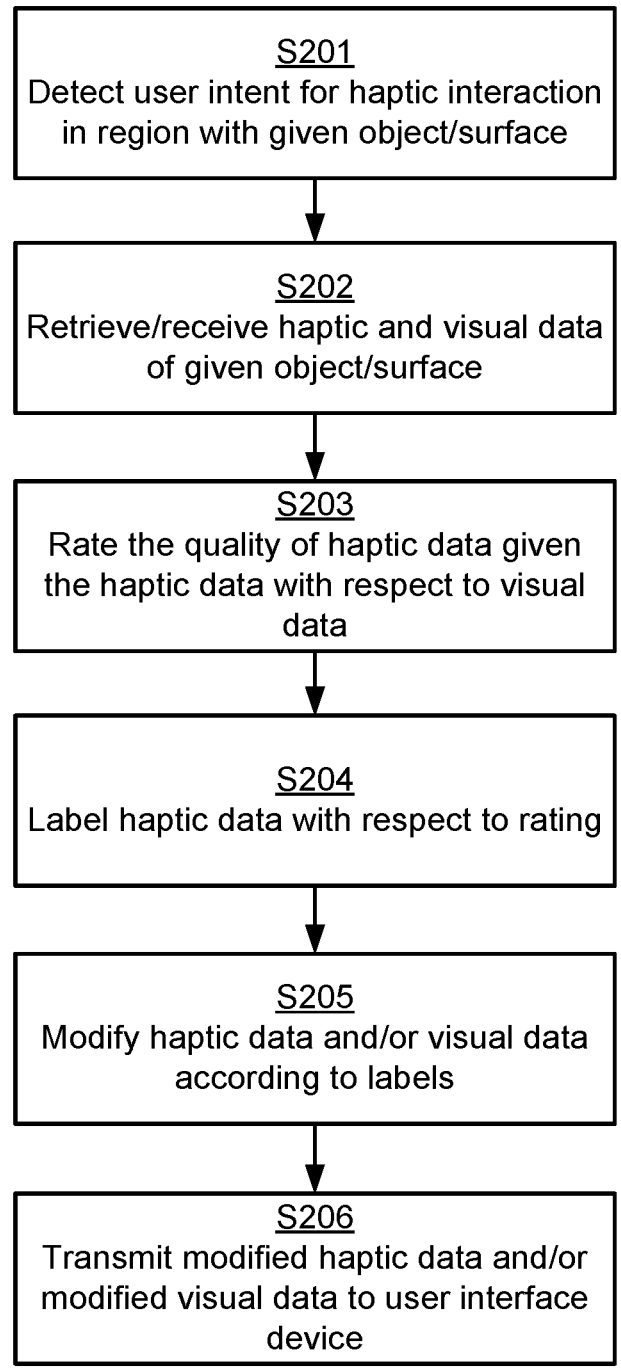

One particular embodiment for classifying a region 310 represented by haptic data and visual data based on at least some of the above disclosed embodiments and performed by the controller 200 will now be disclosed with reference to the flowchart of FIG. 5.

S201: The controller 200 detects user intent for haptic interaction with a given object. One way to implement step S201 is to perform step S102.

S202: The controller 200 obtains haptic data and visual data of the given object. One way to implement step S202 is to perform step S104.

S203: The controller 200 rates the quality of the haptic data, given the haptic data with respect to the visual data. One way to implement step S203 is to perform any of step S106.

S204: The controller 200 labels the haptic data with respect to the quality rating of the haptic data. One way to implement step S204 is to perform step S108.

S205: The controller 200 modifies the haptic data and/or the visual data according to the labels. One way to implement step S205 is to perform any of steps S110, S110a, S110b.

S206: The controller 200 transmits the modified haptic data and/or visual data to a user interface device 130, 140a, 140b for display to the user. One way to implement step S206 is to perform any of steps S112a, S112b.

Figure 6:
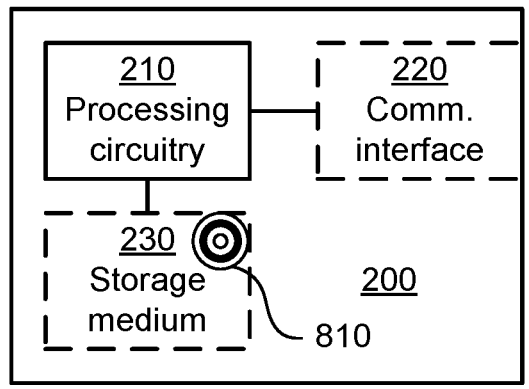
FIG. 6 is a schematic diagram showing functional units of a controller according to an embodiment.

FIG. 6 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product Bio (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, S102-S112b, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with at least one of a server no, a visual user interface device 130, a haptic user interface device 140a, 140b, and a database 120. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 7:
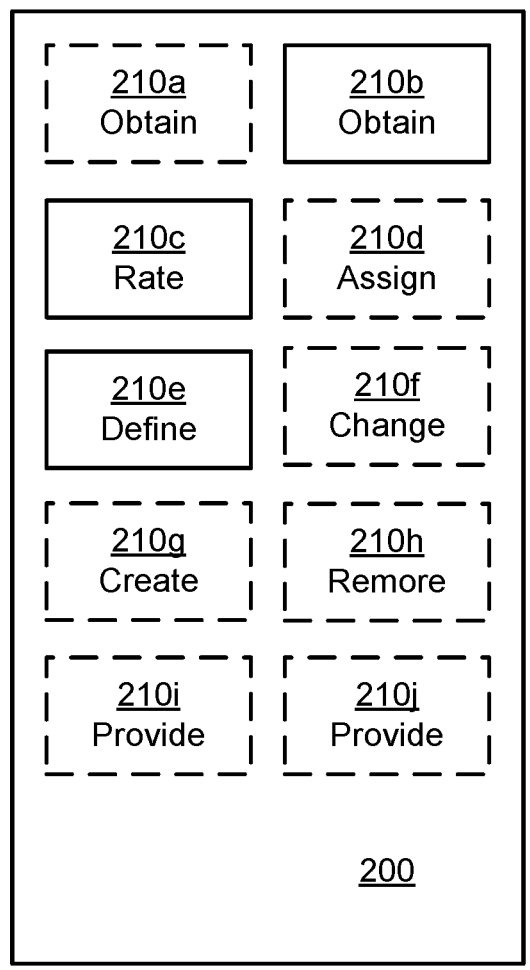
FIG. 7 is a schematic diagram showing functional modules of a controller according to an embodiment.

FIG. 7 schematically illustrates, in terms of a number of functional modules, the components of a controller 200 according to an embodiment. The controller 200 of FIG. 7 comprises a number of functional modules; a first obtain module 210b configured to perform step S104, a rate module 210C configured to perform step S106, and a define module 210e configured to perform step S110. The controller 200 of FIG. 7 may further comprise a number of optional functional modules, such as any of a second obtain module 210a configured to perform step S102, an assign module 210d configured to perform step S108, a change module 210f configured to perform step S110a, a create module 210g configured to perform step S110b, a remove module 210h configured to perform step S110c, a first provide module 210i configured to perform step S112a, and a second provide module 210j configured to perform step S112b.

In general terms, each functional module 210a-210j may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210j may be implemented by the processing circuitry 210, possibly in cooperation with the communications interface 220 and/or the storage medium 230. The processing circuitry 210 may thus be configured to from the storage medium 230 fetch instructions as provided by a functional module 210a-210j and to execute these instructions, thereby performing any steps as disclosed herein.

The controller 200 may be provided as a standalone device or as a part of at least one further device. Aspects related thereto will now be disclosed.

In one embodiment, the controller 200 is implemented in the server 110 and has the object properties locally available in the database 120, while in another embodiment the object properties are received from sensors at the visual user interface device 130 and the haptic user interface device 140a, 140b and models are generated at the server no. In yet another embodiment, the server no receives the models directly from other devices.

In another embodiment, at least part of the functionality of the controller 200 is implemented in the visual user interface device 130 such that the controller 200 in the visual user interface device 130 is configured to, based on information received from the server 110, perform at least the modification of the visual model before displaying it. In yet another embodiment, at least part of the functionality of the controller 200 is implemented in the haptic user interface device 140a, 140b such that the controller 200 in the haptic user interface device 140a, 140b is configured to perform the quality rating for each part of the region.

In yet another embodiment, the complete functionality of the controller 200 is only implemented in one of the visual user interface device 130, the haptic user interface device 140a, 140b. In yet another embodiment, the functionality of the controller 200 is distributed between the visual user interface device 130, the haptic user interface device 140a, 140b and server no. Depending on the architecture, the energy expenditures may vary due to the level of communication required between the units, and so, different architectural choices can be made.

Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 6 the processing circuitry 210 may be distributed among a plurality of devices, or nodes. The same applies to the functional modules 210a-210j of FIG. 7 and the computer program 820 of FIG. 8 (see below).

Figure 8:
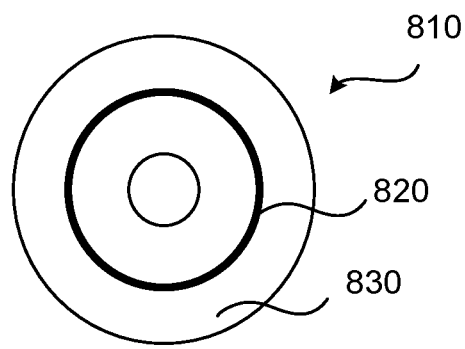
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for region of interest classifying a region, the region being represented by haptic data and visual data, the method being performed by a controller, the method comprising:
   obtaining the haptic data and the visual data of the region;
   quality rating the haptic data in at least part of the region based on at least one property of the haptic data and with respect to the visual data in said at least part of the region; and
   defining at least one region of interest in the region by modifying at least one of the haptic data and the visual data of said at least part of the region according to the quality rating of the haptic data, thereby region of interest classifying the region.

2. The method according to claim 1, further comprising:
   obtaining, from a haptic user interface device, an indication of user intent for haptic interaction with an object in said at least part of the region.

3. The method according to claim 2, wherein the haptic data and the visual data of the object are obtained in response thereto.

4. The method according to claim 2, wherein the quality rating of the haptic data is based on at least one property of the haptic user interface device.

5. The method according to claim 1, wherein said at least part of the region comprises an object having an interior and a surface enclosing the interior, and wherein the haptic data and the visual data of said at least part of the region relate to the surface of the object or the interior of the object.

6. The method according to claim 1, wherein said at least one property of the haptic data relates to amount of details in the haptic data.

7. The method according to claim 1, wherein the quality rating the haptic data is based on amount of details in the visual data.

8. The method according to claim 1, wherein the quality rating of the haptic data is based on visual information of said at least part of the region, said visual information being received from a visual user interface device.

9. The method according to claim 1, wherein said quality rating of the haptic data is time dependent.

10. The method according to claim 1, wherein said quality rating of the haptic data relates to at least one property of haptic data in a group of stiffness, friction, texture, temperature, vibration, force, and weight.

11. The method according to claim 1, wherein said quality rating of the haptic data depends on colour and depth information in the visual data in said at least part of the region.

12. The method according to claim 1, further comprising:
   assigning labels to the haptic data with respect to the quality rating of the haptic data.

13. The method according to claim 12, wherein each label is associated with a respective level importance indication, and wherein said quality rating of the haptic data depends on said level of importance indication.

14. The method according to claim 12, wherein the at least one of the haptic data and the visual data is modified according to the labels.

15. The method according to claim 1, wherein said quality rating of the haptic data comprises correlating the haptic data said in at least part of the region with the visual data in said at least part of the region.

16. The method according to claim 1, wherein said modifying comprises:
changing a transparency parameter of at least one of the visual data and the haptic data of said at least part of the region.

17. The method according to claim 1, wherein said modifying comprises:
creating an outline around said at least part of the region in at least one of the haptic data and the visual data.

18. The method according to claim 1, wherein the quality rating of the haptic data in the at least part of the region indicates that the at least part of the region has higher haptic quality than an adjoining part of the region, and wherein said modifying comprises:
removing haptic data from said adjoining part.

19. A controller for region of interest classifying a region, the region being represented by haptic data and visual data, the controller comprising:
processing circuitry; and
a storage medium storing instructions that, when executed by the processing circuitry, cause the controller to:
obtain the haptic data and the visual data of the region;
quality rate the haptic data in at least part of the region based on at least one property of the haptic data and with respect to the visual data in said at least part of the region; and
define at least one region of interest in the region by modifying at least one of the haptic data and the visual data of said at least part of the region according to the quality rating of the haptic data, thereby region of interest classifying the region.

20. A computer program product for region of interest classifying a region, the region being represented by haptic data and visual data, the computer program product comprising a non-transitory computer readable medium storing computer code which, when run on processing circuitry of a controller, causes the controller to:
obtain the haptic data and the visual data of the region;
quality rate the haptic data in at least part of the region based on at least one property of the haptic data and with respect to the visual data in said at least part of the region; and
define at least one region of interest in the region by modifying at least one of the haptic data and the visual data of said at least part of the region according to the quality rating of the haptic data, thereby region of interest classifying the region.

* * * * *